(No Model.)
W. W. TUCKER & C. L. GOODRICH.
DRIVING MECHANISM FOR VELOCIPEDES.
No. 597,209. Patented Jan. 11, 1898.
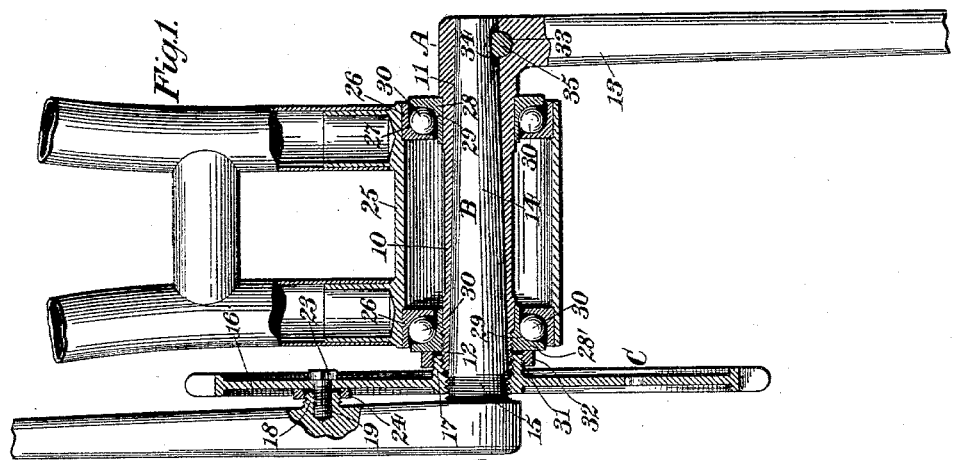
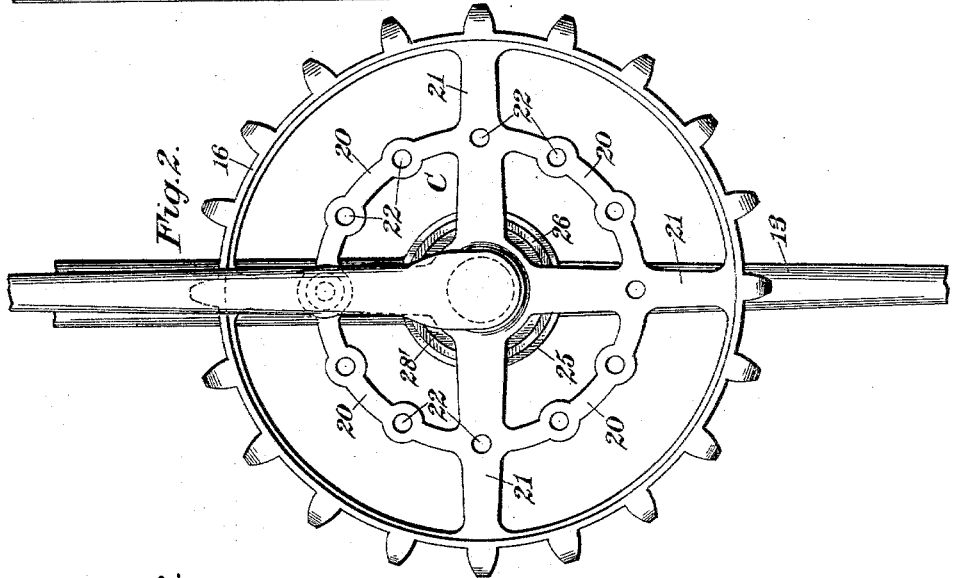
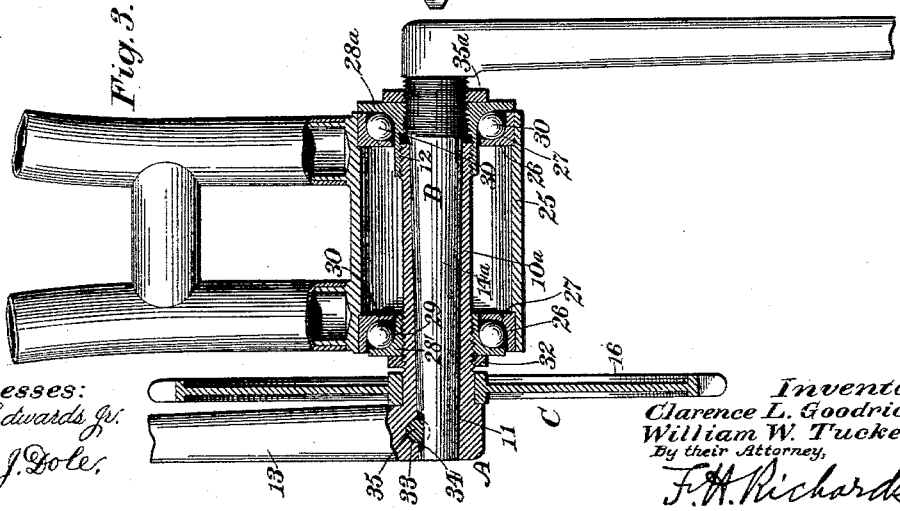
Witnesses:
J. L. Edwards Jr.
Fred J. Dole.
Inventors:
Clarence L. Goodrich,
William W. Tucker.
By their Attorney,
F. H. Richards.

UNITED STATES PATENT OFFICE.

WILLIAM W. TUCKER AND CLARENCE L. GOODRICH, OF HARTFORD, CONNECTICUT.

DRIVING MECHANISM FOR VELOCIPEDES.

SPECIFICATION forming part of Letters Patent No. 597,209, dated January 11, 1898.

Application filed June 26, 1896. Serial No. 597,070. (No model.)

*To all whom it may concern:*

Be it known that we, WILLIAM W. TUCKER and CLARENCE L. GOODRICH, citizens of the United States, residing at Hartford, in the county of Hartford and State of Connecticut, have invented certain new and useful Improvements in Driving Mechanism for Velocipedes, of which the following is a specification.

This invention relates to driving apparatus or driving-gear and is more particularly designated as "driving mechanism for velocipedes," the object being to provide an improved driving mechanism which will not only be simple in its construction, but which can be quickly and easily assembled and disassembled, and when assembled will form a strong and durable device for the purpose for which it is to be used.

In the drawings accompanying and forming part of this specification, Figure 1 is a longitudinal sectional view of a pedal-shaft bearing and one form of this improved driving mechanism supported thereby, parts thereof being shown in elevation. Fig. 2 is a left-hand end view thereof looking toward the right; and Fig. 3 is also a longitudinal sectional view of a pedal-shaft bearing with another form of this improved driving mechanism supported thereby, parts thereof being shown in elevation.

Similar characters designate like parts in all the figures of the drawings.

As a preface to a description of this improved driving gear or apparatus it will be understood that the same can be used in connection with other mechanism than velocipedes where shafts or crank-shafts of this character are applicable; but for the purposes of this specification the same will be described in connection with a velocipede, such as a bicycle.

In a general way this improved driving gear or apparatus comprises two elongated members, (designated generally by A and B,) one of which, as A, has a tubular and tapering bore and the other of which, as B, has a tapering exterior face and is adapted to enter and extend entirely through the tapering bore of the tubular member whereby they form a shaft, each member thereof having a wedge-shaped or tapered surface and each member having screw-threads near one of its ends for the reception of a coupling or wedging member, (designated in a general way by C,) and which coupling member is provided on its interior with right and left hand screw-threads adapted to engage the threads of the inner and outer members respectively, whereby said members will be wedged together, and in one form thereof each of these elongated members is also provided with a crank preferably integral therewith, although it may be detachable, these cranks being oppositely disposed relatively to each other.

When this device is used in connection with a bicycle or similar vehicle in its preferred form herein shown and described, the member A comprises a tubular or outer shaft 10, having a tapering bore 11, extending from end to end thereof longitudinally through the same and formed at one end (herein shown as that end having the largest internal diameter) with exterior threads, such as left-hand threads 12, and provided at its opposite end with a pedal-crank 13, preferably integral therewith. The other member, B, of this improved shaft comprises either a solid or a tubular shaft 14, as may be desired, tapering from end to end thereof or having an externally-tapering face, and which shaft extends entirely through the taper-bored shaft 10. This shaft 14 is also formed with screw-threads (preferably right-hand screw-threads) 15 at that end thereof adjacent to the threaded end of the tubular shaft 10 and herein shown as its largest end and provided with a pedal-crank preferably integral therewith, although it may be detachable at that end thereof adjacent to its threads. As one means for wedging these shafts 10 and 14 together a coupling or wedging member C is provided, which may comprise a tubular sleeve or other suitable means having right and left hand screw-threads on its interior, whereby it can encircle and engage the threaded ends of the shafts, so that on turning the same the two shafts will be wedged together in a manner that will be readily understood. In one form thereof this coupling or wedging member C comprises a power-transmitting device, such as a sprocket-wheel 16, having an elongated tubular hub 17, provided on its interior with right and left hand threads for engaging the right and left hand threads of the shafts 10 and 14. As a means for holding this coupling member or sprocket-wheel in position to prevent rotation thereof independently of the shaft said sprocket-wheel is secured to the adjacent pedal-crank in any suitable and desired way; but in the structure shown the pedal-crank has on its inner side a projection 18, having a threaded aperture 19, and the sprocket-wheel in the form shown is provided with a circular member comprising a series of arms 20, joined at their ends to the usual supporting arms or spokes 21 of the sprocket-wheel, and which arms 20 are intermediate the sprocket-rim and hub and have a series of apertures 22 shown equidistantly disposed therein. When the wheel has been properly turned on the threaded portions of the shafts 10 and 14 to wedge the same together, one of the openings 22 will be brought into alinement with the opening 19 of the pedal-crank, whereby a fastening device, such as a screw 23, can be inserted through said opening 22 and into the threaded aperture 19 of the pedal-crank to thereby firmly secure said sprocket-wheel and pedal-crank together against movement independently of each other and also hold the sprocket-wheel against movement independently of the shaft. This fastening together of the sprocket-wheel and pedal-crank also constitutes, to a certain extent, a driving device for directly applying the power to the crank.

The projection 18 is herein shown exteriorly threaded for the reception of a check-nut 24, whereby a bearing-surface is secured for the outer side of the sprocket-wheel throughout all adjustments of the same toward or from the pedal-crank. As a means for supporting this crank-shaft in position on a bicycle or other similar vehicle a bearing member or sleeve 25 is shown adapted to be mounted in the wheel-frame in the usual manner, and which bearing-sleeve in the constructions illustrated is provided with two ring-shaped members 26, having concaved seats 27. The shafts 10 and 14 project through this bearing member, the exterior shaft 10 having two ring-shaped members 28 and 28', formed with concaved seats 29, whereby they constitute with the cone-shaped seats of the ring members 26 a raceway with suitable antifriction-balls 30. The ring-shaped member 28' adjacent to the threaded end of the tubular shaft preferably has interior threads for engaging a part of the threads 12 of the shaft 10, whereby it is adjustable to take up the wear of the bearings and also removable to permit the assembling of the various parts of the device in a manner hereinafter set forth. In this construction the hub 17 of the sprocket-wheel is formed with exterior threads 31 for the reception of a check-nut 32 for the adjustable ring member 28'.

As a means for preventing the turning or slipping of one shaft relatively to the other, in addition to the wedging action thereof, the shafts adjacent to one end thereof have transverse recesses 33 and 34 communicating with each other, whereby a flat-faced pin 35 can be inserted to secure the same together against independent movement and which pin may have a threaded head, if desired. The recess 34, which is herein shown extending through the inner shaft, is elongated to permit the longitudinal movement of one shaft relatively to the other when the coupling member is rotated.

In another form of this improved device the coupling or wedging member preferably comprises one of the ball-bearing ring members, as 28$^a$, which is elongated at its shaft-engaging portion for this purpose and is provided on its interior with right and left threads for engaging the right and left threads of the shafts 10$^a$ and 14$^a$, whereby the same may be wedged in position relatively to each other, a suitable check-nut 35$^a$ being disposed in position to engage the threads of the interior shaft 14$^a$ for holding such coupling member 28$^a$ against movement. In this form of structure the sprocket-wheel is preferably disposed at the opposite end from the coupling member 28$^a$, the other parts of the device being substantially similar to the construction heretofore described in connection with Figs. 1 and 2 with the exception that the sprocket-wheel is not herein shown secured to the pedal-crank, except in so far as a part of the shaft 10$^a$ adjacent to said pedal-crank would be considered a portion of the crank-hub.

In assembling the driving mechanism as shown in Figs. 1 and 2 the outer tubular shaft is first inserted through the bearing-sleeve and the removable ring member 28' is then placed in position thereon. The sprocket-wheel is then placed on the inner shaft 14 and the check-nut 32 placed on the threaded portion of the tubular hub of the sprocket-wheel. The inner shaft 14 is then inserted into the tubular shaft 10 and the sprocket-wheel turned to wedge the two shafts firmly and securely together, the check-nut 32 being turned to bring it into position to hold the removable ring member 28' against movement. The sprocket-wheel is then secured by its fastening device 23 to the pedal-crank and the flat-faced pin 35 inserted through the transverse apertures 33 and 34 of the shafts, whereupon the device is assembled for use. By this construction a strong and durable crank-shaft is formed in which one part cannot slip or turn relatively to the other part thereof and in which the necessity of having tapering pins for securing the pedal-cranks in position on the shafts is obviated.

In assembling the structure shown in Fig. 3, the sprocket-wheel having been placed on the tubular shaft 10$^a$, together with the check-nut 32 and the removable ring member 28', the shaft is inserted into the bearing-sleeve 25. The coupling member or wedging member is then placed in position on the inner shaft, together with its check-nut 35ᵃ, and such inner shaft then inserted into the outer tubular shaft, whereupon the coupling member may be adjusted to wedge the shafts together in a manner that will be obvious without further description. The flat-faced pin 35 is then inserted in the transverse apertures 33 and 34 of the shafts, whereupon the parts are assembled for use.

No claim is herein made to the combination of a bearing-sleeve, a tubular crank-shaft extending entirely through and rotatable therein and having a tapering bore extending longitudinally from end to end of said crank-shaft, and a central tapering crank-shaft extending entirely through said tubular shaft-bore from end to end thereof and detachably secured for rotation therewith, as such subject-matter is the invention of Clarence L. Goodrich and is set forth and claimed in his application, filed November 18, 1895, Serial No. 569,264.

Having described our invention, we claim—

1. The combination, with a bearing-sleeve, of crank-shafts mounted in said sleeve and one extending through the other; a coupling member provided with threads engaging external threads at one end of each of said shafts; and a locking-pin fitted in transverse recesses in the ends of the shafts, one of said recesses being elongated to permit the longitudinal adjustment of one shaft relatively to the other.

2. The combination, with a bearing-sleeve, of a tubular crank-shaft provided with a screw-threaded portion at one end; a second crank-shaft located within the first-mentioned shaft and also having a screw-threaded portion adjacent to one end; a sprocket-wheel having a threaded hub engaging both of said threaded portions and also having a circular member comprising arms having apertures equidistantly disposed therein; a screw adapted to pass through any one of said apertures; an internally and externally threaded projection on the crank, with the inner threads of which the screw engages; and a check-nut engaging with the external threads of said projection and bearing against the part of the sprocket-wheel through which said screw passes.

WILLIAM W. TUCKER.
CLARENCE L. GOODRICH.

Witnesses:
  FRED. J. DOLE,
  HENRY BISSELL.